United States Patent [19]
Ditzik

[11] Patent Number: 5,966,108
[45] Date of Patent: Oct. 12, 1999

[54] DIRECT VIEW DISPLAY DEVICE INTEGRATION TECHNIQUES

[76] Inventor: Richard J. Ditzik, 3143 Carnegie Ct., San Diego, Calif. 92122

[21] Appl. No.: 09/094,951

[22] Filed: Jun. 15, 1998

Related U.S. Application Data

[62] Division of application No. 08/254,169, Jun. 6, 1994, Pat. No. 5,771,039.

[51] Int. Cl.$^6$ ....................................................... G09G 3/22
[52] U.S. Cl. .............................................. 345/74; 445/24
[58] Field of Search ................................. 345/55, 74, 76, 345/80; 445/24, 29, 49, 50, 51; 216/13, 11; 313/309, 336, 351

[56] References Cited

U.S. PATENT DOCUMENTS

| | | | |
|---|---|---|---|
| 5,094,642 | 3/1992 | Reichelt et al. | 445/24 |
| 5,148,079 | 9/1992 | Kado et al. | 313/309 |
| 5,238,435 | 8/1993 | Te Velde | 445/24 |
| 5,386,172 | 1/1995 | Komatsu | 313/309 |
| 5,563,470 | 10/1996 | Li | 445/24 |

*Primary Examiner*—Regina Liang

[57] ABSTRACT

Display device integration techniques and structures are disclosed that improve display performance, usability, and reduce system cost. The improved designs and techniques involve direct view display devices, pen/stylus input devices, Integrated Circuit (IC) driver units (74), backlight devices (41) and fiberoptic faceplates (3, 6). The types of display devices, included in the inventions, may involve Cathode Ray Tube (CRT) displays, Liquid Crystal Displays (LCD), as well as other type of displays, including flat panel displays. The pen/stylus input device consists of a pen/stylus (5), a sensor/emitter film (4), and pen encoding electronics (20). One or more fiberoptic faceplates may be included. The inside surface of the fiberoptic faceplate may be reticulated, having reflective structures (28) and phosphor dots (12) applied. Distributed Index planar micro lens arrays may be incorporated instead of fiberoptic faceplates. The backlight device may include several light sources (41A, 41B), a fiber backplate (45) and several pig tail regions (56, 58). A new micro tip semiconductor tunneling technology is disclosed for the interconnection of two or more IC units or display sub-panels, without actual physical conductor-to-conductor contact.

12 Claims, 7 Drawing Sheets

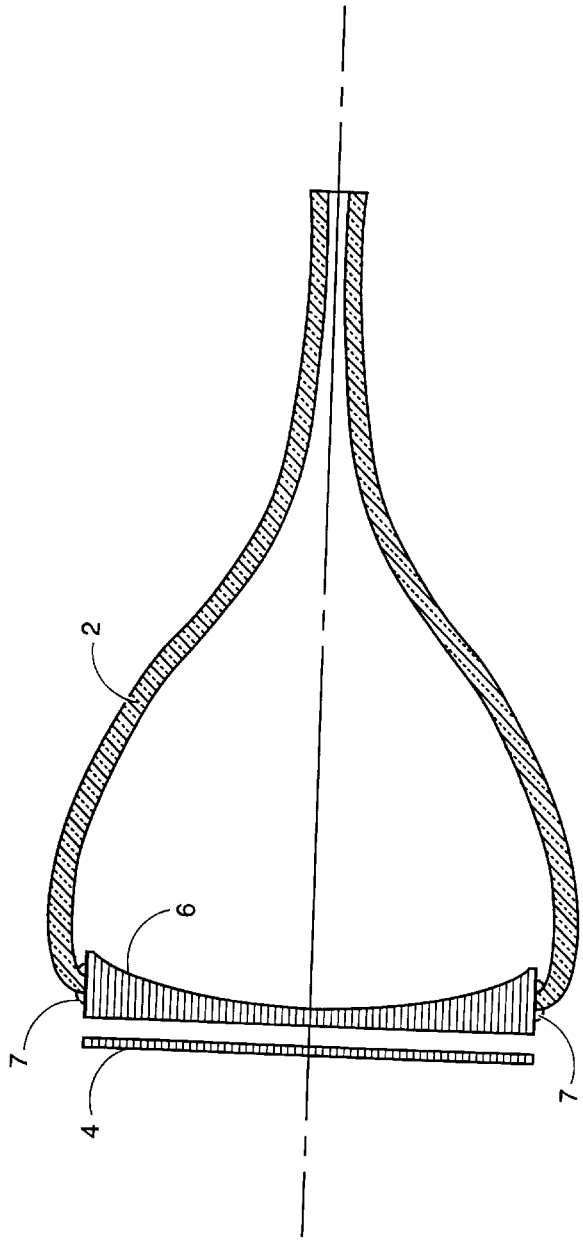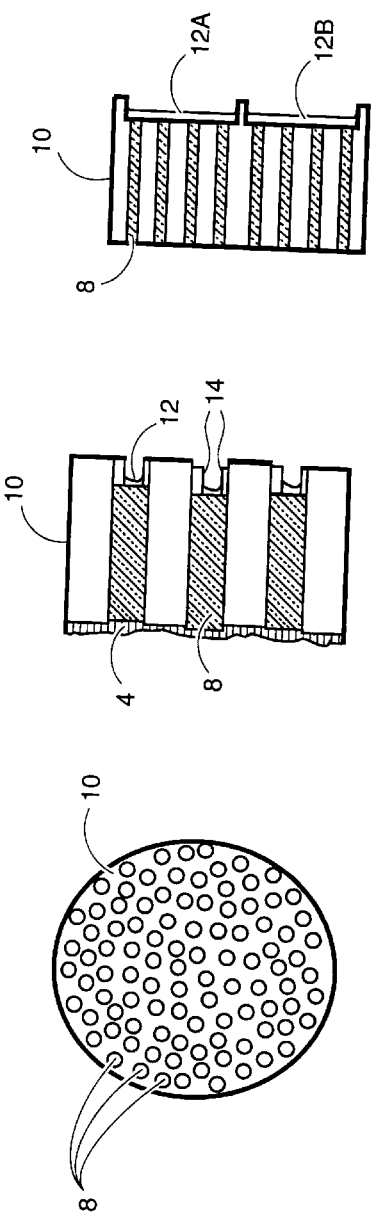

SECTION A-A
DETAIL

EXPLODED VIEW

DIRECT VIEW DISPLAY DEVICE INTEGRATION TECHNIQUES

This is a divisional application, wherein the entire disclosure of Ser. No. 08/254,169, filed on Jun. 6, 1994, now U.S. Pat. No. 5,771,039, is hereby incorporated by reference.

FIELD OF INVENTION

The invention relates to the design, integration and fabrication of display devices, integrated circuits and pen/stylus input means, for computers, teleconferencing systems, TV-like entertainment systems and related highly interactive electronic systems. In particular it relates to electronic, mechanical and optical designs for enhanced interactively, useability and performance of direct view display devices and man-machine interface systems.

BACKGROUND

The prior art in the field of flat panel display devices includes: Liquid Crystal Displays (LCD), Cathode Ray Tube (CRT) displays, pen/stylus input screen means, and fiberoptic faceplates. There is a great amount of prior art in LCD and CRT devices and systems. There is a fair amount of prior art in pen or stylus position input encoding means, which is defined as apparatus used to determine (encode) the position of a stylus or pen as it is moved over an area by the hand of a person. Thus, when a person writes, draws or sketches onto or over and an active area, a signal is generated representing its position repeatedly as the pen is moved. Typically, these devices make use of a electromagnetic sensors or emitters that either cover the front of a display screen or placed behind the screen. Prior art combinations of pen input devices with display devices include U.S. Pat. No. 4,361,725 of Dagnelie, which discloses a CRT with a roughly transparent grid placed onto a conventional CRT glass faceplate. Prior art in the combination of touch panels to a displays include Japanese Patent 59-184925 of Sugiyama, which discloses a touch screen placed over a CRT. U.S. Pat. No. 4,911,536 of Ditzik discloses a graphic tablet encoding means placed over an projection screen of a non-direct view projection display device. Each of these prior art combinations suffer from several shortcomings, such as the parallax effect, large number of parts, and/or high cost.

Prior art in fiberoptic (FO) faceplates involve placing them onto display devices for the purpose of optical coupling the display screen to an optical system, or using them in high brightness direct view displays. CRTs have been manufactured with fiberoptic plates, which focuses and relays the image from the CRT to a light valve or large screen projection system. U.S. Pat. No. 4,591,232 of Jeskey disclosed fiberoptic CRT faceplates that have light absorbing black fibers dispersed throughout the bundle to reduce "halation" or "ballooning" of the image. U.S. Pat. No. 4,573,082 of Jeskey disclosed a similar CRT fiberoptic faceplate for optical transfer of an enhanced image to a projection screen. In addition, European Patent 0122829 of Rover et. al. disclosed a fiberplate to act as an optical filter in order to provide optimum visibility of a display device under a variety of ambient viewing conditions. The primary shortcoming of the these piror art display devices is that they do not disclose or anticipate pen/stylus input means integrated with a display. This puts such display devices at a severe disadvantage in the highly interactive computer, display, and PDA markets.

There is prior art in placing stylus digitizers onto display devices. For example, U.S. Pat. No. 3,671,668 of Reiffel discloses a CRT having a standard glass faceplate with a transparent spatial signal generator placed onto it and separated by an air gap. U.S. Pat. No. 4,723,836 of Kono and Inoue disclosed an electromagnetic opaque digitizer tablet placed behind a LCD panel. However, in each of these cases, there exists a top glass substrate, a polarizer and other components between the display image and the viewer's eyes. The thickness of these components causes an undesirable effect of parallax. The parallax effect is defined as the viewable gap or distance between the pen/stylus tip placed onto the screen and the actual viewed image. The above display devices and pen/stylus input device combinations have parallax. This is very annoying and objectionable effect to the user who is trying to write or draw onto the display screen. It is especially a problem with CRT displays, which may have faceplates roughly 0.5–0.85 inch thick.

U.S. Pat. No. 4,873,398 of Hubby discloses means to reduce the parallax effect by introducing a lens or lens arrays placed between a LCD panel and a transparent digitizer means. Hubby's lens or array projects the image from the display through the digitizer plate to a separate rear projection screen. This may reduce the parallax effect somewhat, but it has several shortcomings. First, the lens array will have significant light loss from lens to lens cross transmission. This will cause a low contrast image. Secondly, the disclosed projection screen must have a thickness; therefore, the screen itself will cause some parallax. Finally, with the prior art components, the displayed image will be distorted by digitizer layer and lens array layers. U.S. Pat. No. 4,943,348 of Ibamoto et al disclose two or more micro lens arrays placed between a LCD and a protective glass or pen tablet means. However, Ibamoto's arrangement introduces unnecessary complexity by having two or more lens arrays to register with respect to each other, for providing an erect image. Ibamoto's fails to realize that an erect image on a pixel bases is not necessary in display devices. The above embodiments suffer from an overly complex design with a high parts count and high associated cost.

Besides the parallax effect, another shortcoming of prior art display devices and pen display combinations is optical glare from the front surface of the screen. Prior art solutions for screen glare involve special coating(s) or frosting the front surface. A disadvantage of placing anti-glare optical coatings onto a display screen is that it adds significant cost to the display. Both of the above anti-glare techniques cause some degradation of the displayed image, due to light scattering and light absorption of the material. These image degradation effects are caused by the various coatings, plates or films placed between the image material (LC or phosphor) and the user's eyes. These shortcoming cause serious ergonomic problems, especially when a person is trying to point, write and/or draw onto the display screen.

The inventions of the applicant overcomes each of the above prior art shortcomings and disadvantages by tightly integrating one or more fiberoptic faceplates to a direct view display device. A first faceplate may be manufactured as a part of the display device. A second faceplate may form a substrate for a pen/stylus input sensor/emitter means. When the second faceplate is placed against the first with very little or no gap, the two faceplates will appear as one plate, of zero thickness, to the viewer. This embodiment will virtually eliminate any parallax effect for the viewer. In addition, there will be less front surface glare and a wider viewing angle. In LCD display panels, a fiberoptic faceplate will provide for a brighter image in darken ambient room lighting conditions. These advantages over the prior art will insure a wider acceptance of the display device in the highly interactive computer, communications, and entertainment markets.

Certain flat panel display devices, such as Liquid Crystal Displays (LCD), may require a backlight for better viewability. A number a backlight technologies are known to provide a relatively uniform light to the back of display panels. Prior art in backlights include electro luminescent, fluorescent, incandescent, and LED light sources. A number of light guide devices have been used to apply light to the rear of the display panel, using various fiber, glass, and plastic optical guides. However, several problems arise when the display must be viewed under sunlight, twilight, or night conditions. Each of these viewing conditions require different backlighting designs. The new multiple backlight invention described herein solves these problems by providing a simple way of using multiple light sources and integrating their light to the rear of an LCD panel.

SUMMARY OF THE INVENTION

A primary object of this invention is to provide a means to integrate a pen/stylus position encoding means to a direct view display device such that it presents a nearly zero parallax effect to the viewer, while presenting a high quality image on a low or no glare viewing screen.

Another primary object of this invention is to provide a means to integrate a flat panel display to its drive electronics and other electro-optic components, so that a lower overall cost to manufacture results.

Still another primary object of the invention is to provide means to physically and electrically interconnect two Integrated Circuits on separate substrates or dyes, by providing micro aligning and bonding structures and processes, so that a low cost hybrid combination can be accomplished.

Another important object of the invention is to provide means for a brighter CRT display screen image on the front surface of a fiberoptic faceplate by improving the reticulation means on the inside surface where the phosphor dots are deposited and the reflective structures are fabricated.

Another important object of the invention is to realize display device products with one or more fiberoptic faceplates to reduce or eliminated any perceived parallax effect, when using a pen, stylus or touch input means in conjunction with a display device.

Still another important object of the invention is to improve quality of displayed images on a CRT and/or flat panel display, including display brightness, contrast, field of view, and color characteristics.

Another important object of the invention is to reduce or eliminate the undesirable front screen glare that typically exists on direct view display devices, including CRT displays and flat panel displays.

Another important object is to realize a backlight system with multiple light illumination sources so that the user can select, via a simple switch, the type and intensity of backlight illumination. For example, the user may select a single light source or a combination of light sources, based on the present ambient lighting conditions.

Still another important object of the invention is to greatly improve the prior art use of lens arrays for transmitting images onto a viewing screen, by using special distributed index planar micro lens arrays, having inter lens absorption means and front surface image focus means.

BRIEF DESCRIPTIONS OF THE DRAWINGS

FIG. 1 is a side section view of a CRT with a fiberoptic faceplate and pen/stylus input film.

FIG. 2 is a front detail view of the fiberoptic faceplate of the CRT display showing the individual fibers and dark matrix material in between.

FIG. 3 is a side detail view of the fiberoptic faceplate of the CRT showing reticulation and roughen front surface.

FIG. 4 is a side detail view of the CRT fiberoptic faceplate with a larger area etched for each phosphor dot.

DETAILED DESCRIPTION

Figure 5B:
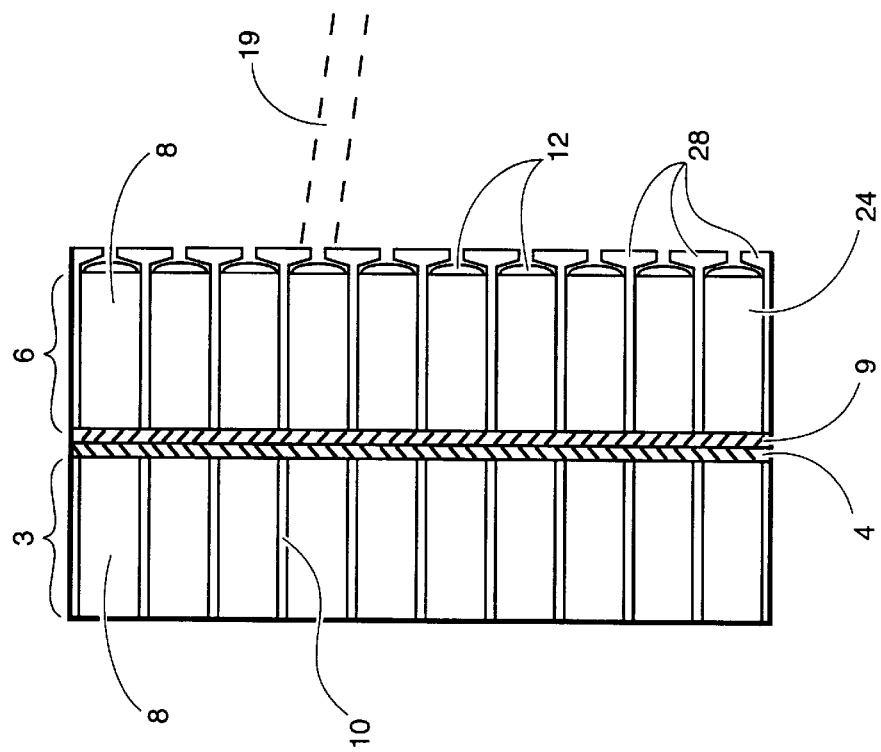
FIG. 5B is a side detail view of the two fiberoptic faceplates and an improved reticulation means.

The invention described in FIG. 1 through FIG. 4 involve integrating an pen, stylus, or touch digitizer sensor/emitter means to a CRT via a fiberoptic (FO) faceplate, instead of a standard clear glass display faceplate as done in the prior art. This invention can be used with CRTs, LCDs or other display technologies. As shown in FIG. 1, a CRT glass funnel part 2 is shown in cross section, with a FO faceplate 6, where a glass frit seal is placed around the edges of the faceplate to the CRT. The high temperature glass frit seal or bonding means is represented as element 7. In CRTs, the frit seal must be strong enough to hold a relatively strong vacuum that will depend on the size and volume of the CRT. Also shown in the figure is a pen sensor/emitter film 4 that is be placed onto the front side of the FO faceplate. This pen sensor/emitter film may consist of one or more transparent or opaque coatings or layers that is part of an overall pen input encoding means. The pen input encoding means, as defined herein, includes finger operated touch panels and stylus input encoding means. The pen coating or film can either act as an signal receiver sensor or signal emitter, depending on the design of encoding means, as is well known to those skilled in the art. The encoding signals may be digital or analog signals, and single or alternating in polarity. If the signals are electro magnetic and alternating, the frequency selected may be in the RF, IR or other suitable frequency ranges.

FIG. 2 shows a front view of a limited number of fibers in more detail. The faceplate is made up of a multiplicity of individual optical fibers 8 and a dark matrix means 10. Each optical fiber 8 includes a cladding coating, and may be as small as 10–100 microns in diameter. They may made of glass, plastic or other suitable transparent material. For example, both the Galileo Electro-optics Corporation and the INCOM, Inc. manufacture fiberoptic faceplates of various sizes, thickness', numerical aperture (NA) and vacuum integrity. The NA is the light gathering power of an optical fiber defined by $NA=[N_1^2-N_2^2]^{1/2}=N_0 \sin q_{max}$, where $N_0$=refractive index of the surrounding medium (usually air), $N_1$=index of the cladding, $N_2$=index of the core, and $q_{max}$=the angle below which all the light rays are accepted by a fiber. The faceplate optically transmits light from one side of the plate to the other with little light loss. Magnification can result if each fiber is made tapered. FO faceplates can be manufactured with a matrix of a dark absorbing means 10. This dark matrix may be made of dark glass, sometime referred to as dark cladding, which is placed in the faceplate to absorb stray light rays. The absorption due to this dark matrix means is called extra mural absorption (EMA). It is possible to manufacture FO faceplates with or without EMA in relatively large dimensions; e.g.; up to roughly 20 inches in diameter. Typical FO faceplate thickness' are 0.5–1.0 inch thick, but larger and smaller thickness' are realizable.

FIG. 3 shows a detailed side view of a cross section of the faceplate 6. The optical fibers 8 running horizontally, are held in a ridged dark matrix means 10. As is know in the art, a statistical EMA may be embodied, which consists of replacing a small percentage (roughly 3%) of the fibers with dark or black fibers. The array of optical fibers 8 and dark matrix means 10 are fused together under high temperature as in know in the art. A reticulation means is applied to the individual fibers on the inside face. Reticulation is defined as a portion of each fiber or group being etched back a small distance, forming small pits. In FIG. 3, each fiber 8 is reticulated, forming a array of roughly cylindrical shaped pits, one for each fiber end. The cylindrical walls of the pits are coated with a thin coating of a opaque reflective material 14, such as nickel or other metal materials. A phosphor material is deposited into the pits forming an array of phosphor dots 12 at the ends of the fibers. Each phosphor dot may be a picture element (pixel), or each dot may form a sub-pixel. Typically there is one sub-pixel for each primary color, red, blue and green. The reflective material prevents crosstalk of light rays at the fiber ends. The pen sensor/emitter film 4 may be coated directly onto the front surface of the faceplate. The FO faceplate surface may be uneven. Rough surfaces scatter light, but polished surfaces reflect light in a specular fashion (mirror like) causing glare. The front surface of the faceplate 6 may be slightly uneven or polished, but the front surface of the pen/stylus coating 4 should be slightly roughened to reduce the undesirable front surface screen glare.

FIG. 4 is a cross section view of another FO faceplate embodiment. Larger area depressions or pits are etched on the inside of the faceplate, encompassing a plurality fibers. A phosphor dot is deposited in these larger depressions. The front-view shape of the etched depressions may be circular for shadow mask CRT's or long strips for Trinitron™ CRT's. The phosphor dot 12A may emit one color of light, and another type phosphor dot 12B may emit another color, forming color sub-pixels. Within the same color phosphor depressions, we may not care if there is light cross-talk between the fibers, but cross talk to adjoining color sub-pixels should not be allowed. Typically, red, green and blue phosphors are used as individual color sub-pixels, which forms a color pixel triad. If each RGB sub-pixel is hit with an electron beam with the appropriate energy, the viewer will see an additive color "white" pixel. The size of typical CRT pixels are roughly 0.25 to 0.50 mm in diameter. Each sub-pixel in the FO faceplate will consist of many small micro fibers. The display viewer will not be able to visibility resolve the individual fibers, but each pixel will be clearly seen.

There are several advantages for this FO faceplate embodiment. A curved CRT faceplate is converted to a flat front surface, preferred for viewing, writing and drawing with the stylus or pen. The parallax effect is virtually eliminated, because the user sees a "zero thickness" faceplate. The front screen surface will have greatly reduced visual glare from ambient room lighting. If a sufficiently thin overcoat is applied to the FO faceplate, the image of the display will not be perceivably degraded. This overcoat may be an anti-glare coating, or a conducting coating as in the sensor/emitter film 4. Thin coatings placed over the fiberoptic faceplate front surface will not cause a loss in image sharpness, if the distance between the image on the fiber ends and the front surface of the coating is small, perhaps 0.5 mm or less.

Figure 5A:
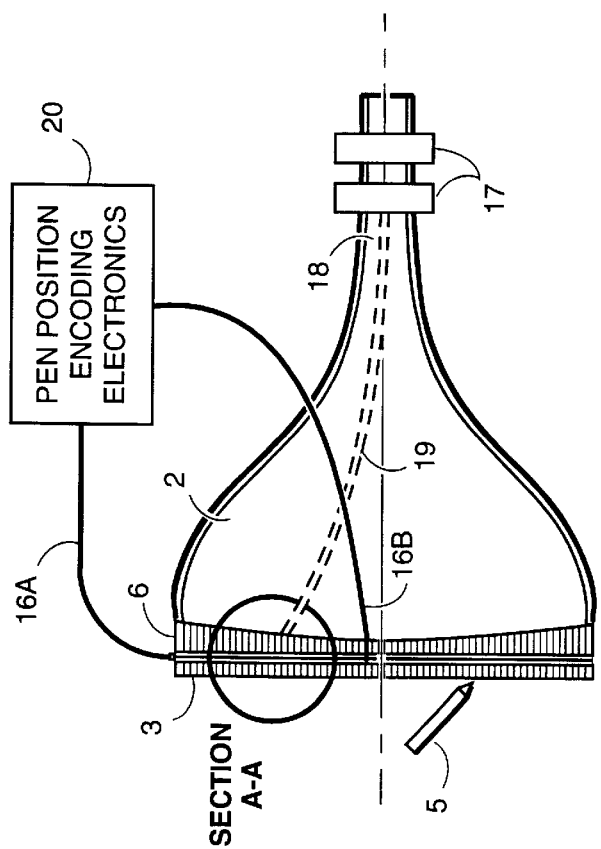
FIG. 5A is a side view of a CRT with two fiberoptic faceplates, a pen/stylus input film and encoding electronics.

FIG. 5A shows another embodiment where FO faceplate 6 glass is frit seal bonded onto a CRT glass bulb funnel 2. As above, the FO faceplate 6 is shown bonded to the funnel portion 2 of a CRT glass funnel. Element 8 is the neck of the CRT, element 16 is the deflection yoke and the electron beam is shown as 19 (the CRT gun is not shown). A second FO faceplate 3 is bonded to the former FO faceplate 6. The pen sensor/emitter film 4 is deposited onto the inside surface of this second faceplate. The pen position encoding sensor or emitter works with a pen or stylus 5, a pen position encoding electronics unit 20, and several electrical wires, (e.g. 16A and 16B) connected to the film 4. The pen may be a stylus with or without a wire. In some encoding means, the pen may be one's finger. Typically, the electrical wire connections are made to the top of the screen for y pen positions and at the side for x positions. The pen sensor/emitter film 4 may be only a few microns thick. The FO faceplate 3 with the film 4 is bonded to the FO faceplate 6 with an optically clear adhesive 9. The inside surface of the FO faceplate 6 can be curved, and the outside or front side can be flat. If the optical index of the optically clear adhesive matches (roughly equivalent) the index of the fibers of the two plates, the light loss of the displayed image transmitted across the two faceplates is small. Preferably, the clear adhesive 9, which may be one of the well known optical glues, should be the type that cures to be semi-rigid bond. This bond should be the type that can be unbonded with relatively little force, at room temperature or at a slightly higher temperature. An advantage of this embodiment is that the optical plate 3 needs to repaired, it can be removed by a technical. Since the pen 5 and the pen encoding electronics 20 may operate at KHz or RF frequencies, these signals can be electrically coupled through the front fiberoptic plate 3 to the sensor/emitter film 4.

There are many pen input devices available for use in the invention herein. For example, the Scripteld ™ Corp. of Columbus Ohio make several digitizer tablets including a RDT-K1 electromagnetic AC model that includes a writing surface, pen, electronics and software. It has a resolution of 500 points per inch (ppi), accuracy of +/−0.010" over the active area, and a data rate of 200 point per second (pps). The Communication Intelligence Corp. of Redwood Shores CA offers their Handwriter® for Windows™, which also is a digitizer product. Their digitizer is capable of a resolution of 1,270 ppi, accuracy of 0.001", a date rate of 200 pps, and a sensing height of 0.5". ACECAD,® Inc. of Monterey, CA makes several Acecat II™ digitizer products, having a resolution up to 2000 lpi, accuracy of +/−0.01", and a sampling rate of 128 pps. Their Model D-8000 Pro has a 8"×12" active area, sampling rate of 150 pps, and accuracy of 1016 lpi. Wacom Technologies, Corp. of Vancouver, WA makes several digitizer tablets and tablet/display combinations. They offer a Model PL-100V display tablet product that has a stylus without a wire attached. The display is a monochrome LCD that is 7.56"×5.67" in size, with a resolution of 540×480 pixels, having 16 level of gray scale. Their tablet specifications include a resolution of 0.002" pitch, an accuracy of +/−0.02" and a data transfer rate of 205 points per second.

FIG. 5B shows a detail view of FIG. 5A's Section A—A, showing the two fiberoptic plates 3 and 6 bonded together. The pen sensor/emitter film 4 and a clear adhesive film 9 are shown along with the individual optical fibers 8, the light blocking matrix 10, and a phosphor dots 12 on the rear of fiber plate 6 (inside of CRT). In an alternate reticulation means, a highly reflective material is deposited onto the rear surface of the CRT FO faceplate 6 which forms a partial "well-like" reflective structures 28 with an opening for each fiber. A suitable material may be Nickel or Chromium, or other highly reflective metal or nonmetal opaque material. These structures may be made by first depositing sufficiently thick coating of reflective material onto the smooth inside rear surface of the fiberoptic faceplate. The reflective structures 28 may be made by lithographic etching techniques, where the etching chemical under cuts the comparatively thick coating material. Both wet and dry photo-lithographic etching procedures are well known, using various photo-lithographic masks, light sensitive resists, etching compounds, etc. The under cutting is more pronounced and better controlled using wet etching techniques than dry etching. The exact shape of this structures 28 is not critical, except that it should reflect a part of the light emitted by the phosphor dots 12 towards the front of the faceplate and then transmitted through the fiber towards the viewer. The opening in the reflective structures 28 must be just large enough for all or a portion of the electron beam 19 to pass through. The size of the opening is made so that sufficient number of electrons get through to sufficiently excite the phosphor dots. The reflective structures 28 may consist of several parts or components, deposited or otherwise fabricated onto the faceplate. In a still another reticulation embodiment, each fiber may be etched and undercut directly, without the need for the added layer 28.

Advantages of the above embodiment are: 1) the faceplates will transmit the displayed image to the front most surface with an apparent zero thickness, i.e.; without visible parallax; 2) the front surface of faceplate may be flat; 3) the two fiberoptic plates may be bonded or placed together without significant light loss; 4) the front FO faceplate may be removed or replaced for ease of repair; and 5) the light glare from a fiberoptic plate front surface is much less than sheet glass or normal clear CRT faceplates. Although the front surface reflection is much lower than standard glass, one may add a reflection coating or roughen the surface slightly to reduce the glare further. Since the image is focused on the front surface, little noticeable image degradation will result.

Figure 6A:
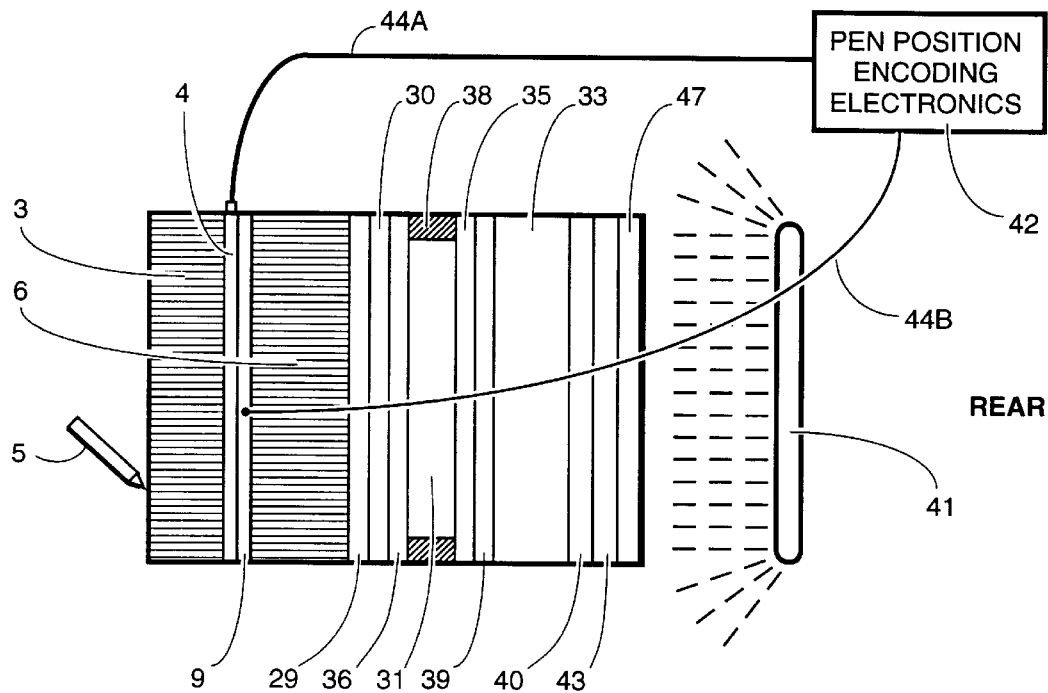
FIG. 6A is a side section view of a LCD panel with two fiberoptic faceplate, pen electronic and backlight means.

FIG. 6A presents a Liquid Crystal Display (LCD) embodiment of the invention. Here the FO faceplate 6 may be similar to that described for the CRT embodiment above, but need not be as thick, because a vacuum is not necessary. Onto this FO faceplate 6 is bonded a second FO faceplate 3. Onto faceplate 3 is deposited the pen sensor/emitter film 4, and an optically clear index matching bonding adhesive 9 can be placed in between the two plates. Both the front and rear surfaces of both FO faceplates can be flat. The light loss crossing this interface is neglatable, because the resistive film and optical glue coating are made very thin, highly transparent, and roughly matching indexes of refraction. The thickness of the pen sensor/emitter film 4 can be in the micron range. Either a very thin optically clear glue can used for the clear adhesive 9. Alternately, a standard adhesive may be placed around the perimeter of the panel with a index matching fluid in between. The FO faceplate 6 forms the top or front substrate of an otherwise standard LCD panel. On the inside rear side of the FO faceplate 6 there typically are several very thin films each approximately a micron thick. For twisted nematic LC panels two crossed polarizer sheets or coatings are required on each side of the LC panel. In FIG. 6, a thin front polarizing film 29 is placed onto the FO faceplate. A front Indium Tin Oxide (ITO) electrode 30 is deposited on top of the front polarizer film. Typically the ITO electrodes are patterned into rows or columns. Also, a front alignment layer 36 is applied to the inside LCD substrate. The alignment layer may consist of a thin film and application treatments, well known to those in the art. The liquid crystal material 31 is filled into the 8–12 micron gap, which is held by spacers/sealers 38 placed between a rear substrate 33 and the FO faceplate 6. The rear substrate, which may be transparent, may have an ITO electrode 39 deposited onto it, and patterned into the corresponding orthogonal rows or columns. The rear ITO electrode 39 may have a rear alignment layer 35 applied to it. Behind the rear glass substrate may be a mirror like surface 47, which may reflect a high percentage of the light entering the front of the panel. It may also be partially transmissive so the that light from a backlight means 41 can pass through toward the LC material.

LCD panels are available from a variety of sources. For example, the Sharp® Electronic Corporation of Camas WA offers a line of LCD panels. They make both passive STN monochrome LCDs and TFT AMLCD color panels, with the drive electronics and backlights. Their Model LM64P series panels are 640×480 pixel monochrome panels in either transmissive or reflective viewing modes. Response times of these panel range from 150 ms to 400 ms, and their brightness from 35 to 100 nits. Sharp® Corporation's TFT color panels are the Model LQ series, that come in sizes from 3" to 10" inches in diagonal. The pixel format for the 9" and 10" panels are 640 (3)×480 pixels, where three sub-pixels are used for the primary colors red, green and blue. Various types of standard cold and hot cathode fluorescent tube backlights are available. LCD panels are also available from Toshiba and the NEC Corporation as well as others manufacturers.

In the FIG. 6A, the backlight means 41 is shown schematically; it may consist of several lights, reflective surfaces and refractive components. The purpose of the backlight is provide an bright even light to the back of the LC panel. The pen position encoding electronics 42, and the first and second electrical conductors (44A and 44B) are also shown in the figure. Although the thickness of standard LCD front substrates are thinner than a CRT's, there is still some unwanted parallax. An advantage to a fiberoptic faceplate on LCDs is that there will be a zero parallax effect. Another advantage is that non-backlit images will appear brighter with higher contrast than panels with normal clear glass—even at low ambient light levels. This effect is due to the action of the individual fibers acting together to guide and reflect light. The backlight is of course optional. A rear polarizing film 40 may be required for twisted nematic and certain other LCDs. A light diffuser 43 may be included, which distributes the backlight evenly over the screen area.

Figure 6B:
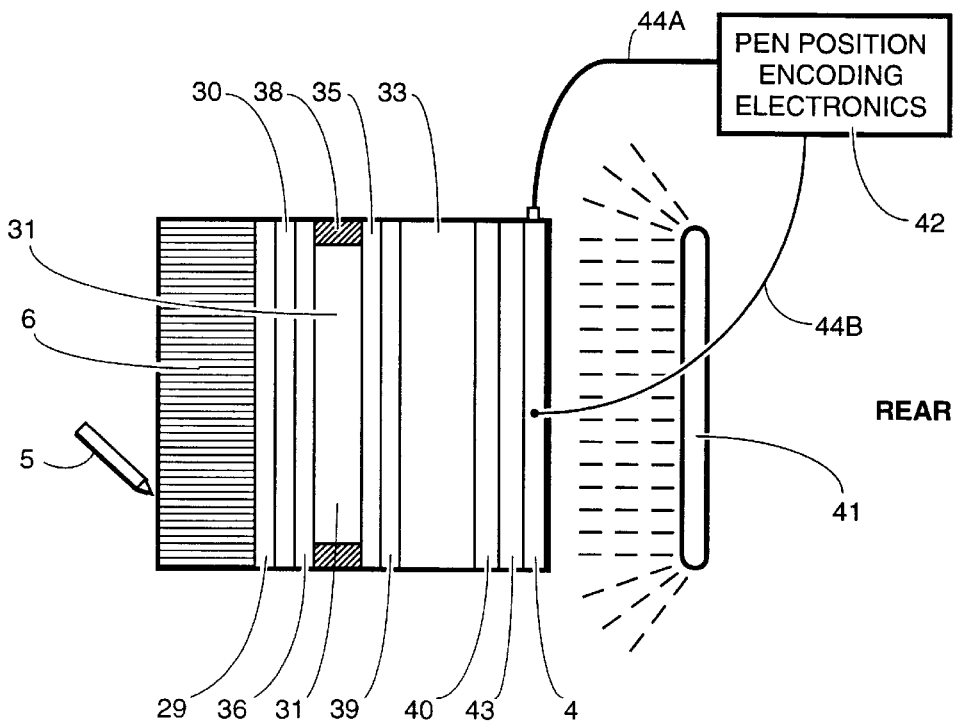
FIG. 6B is a side section view of a LCD panel with a fiberoptic faceplate and pen/stylus sensor/emitter film placed at the rear.

FIG. 6B shows an alternate embodiment similar to the one above, but with the pen sensor/emitter film 4 element placed at the rear of the LCD panel. If a backlight is used, as shown in the figure, the film must be roughly transparent. If the LCD panel is to be viewed in the reflective mode only, and it is placed at the rear position, then the film may be opaque. In the above embodiment, there may be a EMI shield (not shown) placed behind the sensor/emitter film to shield any nearby electrical circuits. The distance from the sensor/emitter to the front surface of the display screen should made as small as possible. If this gap is small, the digitizer is more accurate in its pen position encoding. If a backlighted LCD is a transmissive or transflexsive type, the position of the transparent film 4 may placed at several different locations behind the LC layer; i.e.; not necessarily the rear most position. An advantage of this embodiment is that there will be less optical distortion of the displayed image on the screen, as seen by the viewer.

Figure 7B:
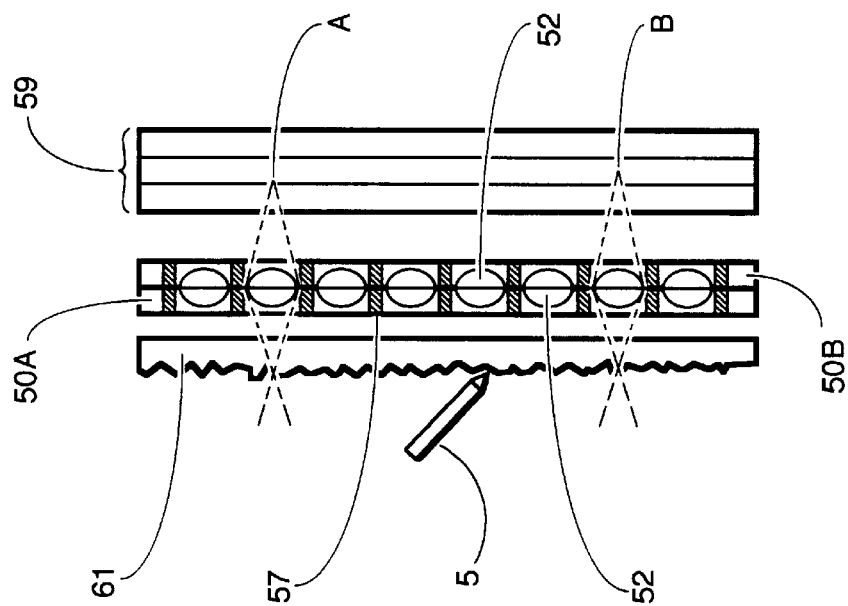
FIG. 7B is a side exploded view of a flat panel display with a double lens array and roughened front image screen.
Figure 7A:
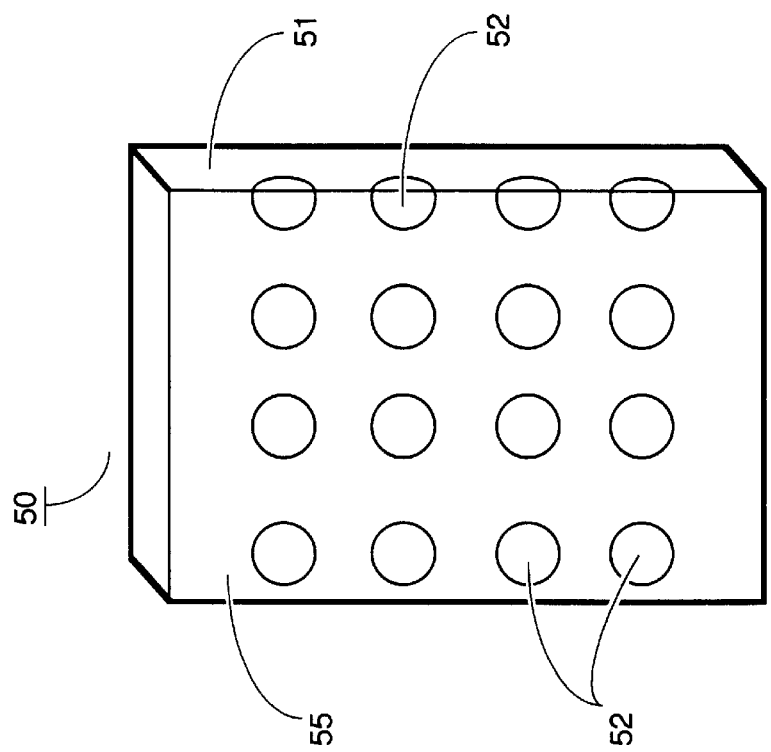
FIG. 7A is a perspective view of distributed index planar micro lens array layer.

FIG. 7A shows a perspective view of a planar lens array sheet 50 consisting of a multiplicity of graded index or distributed index (DI) micro lenses 52. The diameter of lenses may be in the 50–500 micron range, and they may be tightly spaced over a thin transparent substrate 51. The DI micro lenses may be made by an ion exchange process, where an array of localized lens areas are formed by a photolithographic masking procedure. Planar DI lens arrays are well known to those skilled it the art. During manufacture, a photolithographic mask with an array of small holes is placed over a transparent substrate, and then placed in a salt solution for a specified time period. The ion exchange phenomenon takes place at the unmask areas, and a roughly semi-spherical shaped volume is formed, having a differing refractive index distributed throughout this small volume. This DI region 52 then acts as a micro lens. The axial index distribution can be controlled by means known to those skilled in this art. An array of planar DI micro lenses 52 is schematically shown in the figure. The DI planar lenses can focus light rays like ordinary lenses. The substrate 51 may be typically a few millimeters thick. In order to block extraneous light rays from crossing over between nearby micro lenses, a light blocking means may be applied between the lenses. This may be embodied by a light blocking mask 55 placed on one or both sides of the lens array 50.

FIG. 7B presents a side exploded view of an flat panel display with one or more DI planar lens array films or sheets, a viewing screen 61 and pen 5. Two DI planar array sheets 50A and 50B may be required to first collected the light rays from the object (a pixel or small group of pixels) on the display and then to focus them to an image surface. The flat panel display is represented by element 59 that may consist of a plurality of components and layers. Depending on the display type, the location of the displayed pixel object may be at several locations within the multi-layer panel. Two such displayed object locations is represented by points A and B. Flat panel display types include LCD, field emission display (FED), electroluminescent (EL), Plasma panel or other displays known in the art. A shortcoming in prior art lens arrays for display devices is that light rays may radiate sufficiently off axis to impinge onto neighboring lenses. This light ray cross talk will cause a low contrast display with objectionable image characteristics. Another embodiment of a light blocking means is shown as matrix of blocking elements 57 placed throughout the substrates 50A and 50B. This may consist of a dark matrix material or dopant introduced between the micro lenses. The focal lengths of the DI lenses 52 are selected such that the object on the display panel is at one focal ponit, and the other focal point is at the front surface of the viewing screen 61. The lens array need not have unity magnification, and image may not be erect. An important advantage of the FIG. 7B embodiment, is that the front surface of the viewing screen 61 can be roughed slightly (shown exaggerated). Since this is also the image surface, the image, as viewed by the user, will not be objectionably defocused. The roughened front surface will significantly reduce the screen glare. The pen 5 is shown on the front surface of the screen. The pen sensor/emitter layer (not shown) may be place at several possible locations. For example, it may be located between the DI lens array and the viewing screen, between the lens array and flat panel display, or at the rear of the display device.

Figure 8:
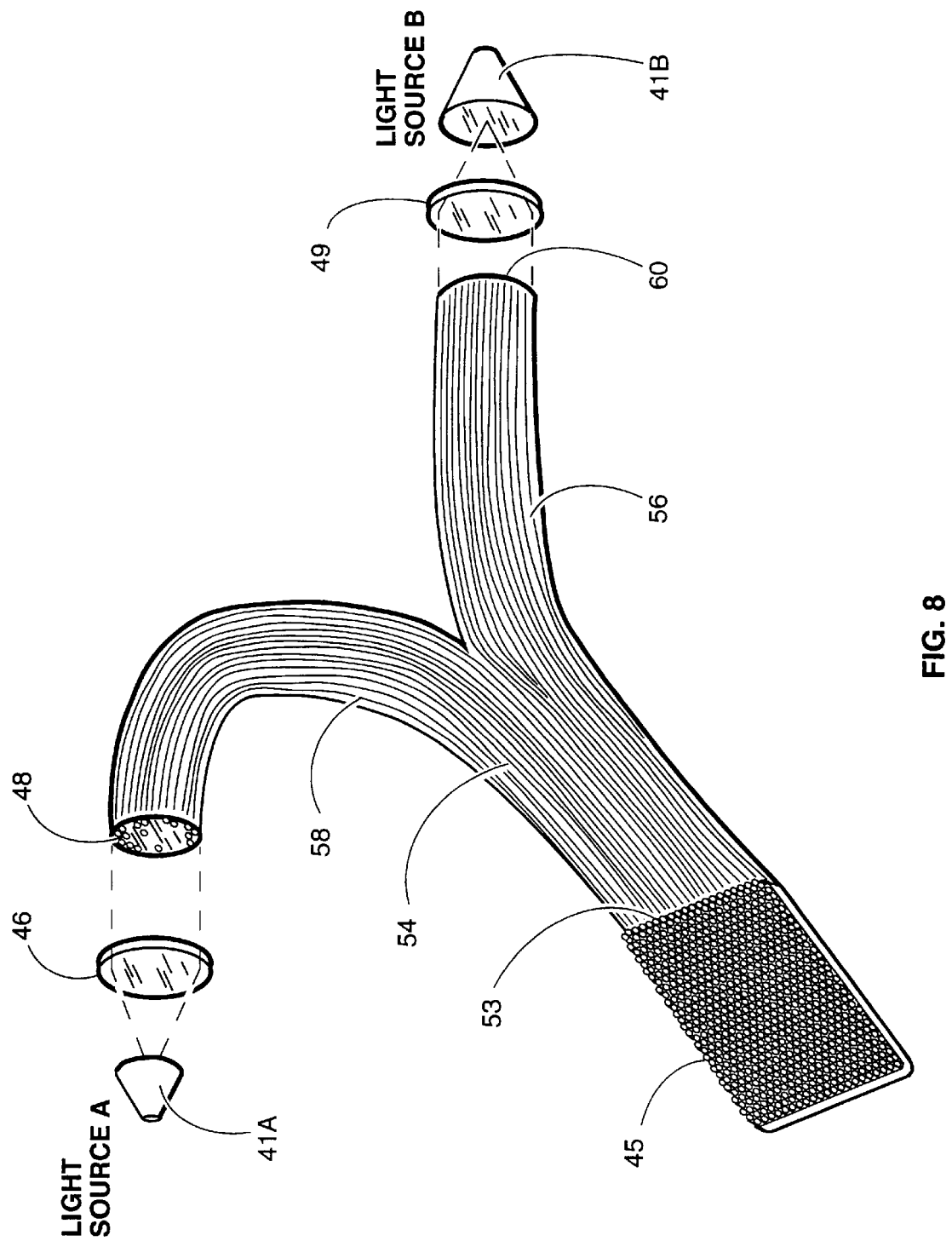
FIG. 8 is a perspective view of pig tailed fiberoptic backlight plate with two light sources and collimator lens systems.

A new type backlight embodiment, shown in FIG. 8, has a specially designed flat relatively thin fiberoptic backlight plate 45, with two or more fiberoptic bundle pigtails, for example 58 and 56. The fiber plate 2 consists of a large array of optical fibers running lengthwise in the plate. The end of each fiber may be bent or curled up and cut flush with the top surface of the plate, or otherwise routed near the top face. The other ends of fibers in the plate are routed along the backlight plate to edge 53. The fiberoptic backlight plate 45 is roughly the same size as the display panel and is placed behind it. The fiber diameters need not be small and their spacing need not be especially fine, as long as the fibers provide a roughly uniform light emission pattern at the back of the LCD. The fibers may be routed continuously, as one element, from the backlight plate 45, through a flexible ribbon region 54, and to the FO pigtails 58 and 56. Alternately, fiber plate 2 could be optically coupled to the ribbon region 54 via a fiber-to-fiber connector at or near the plate edge 53.

Each fiber, in the ribbon region 54, is split in to two or more fiber bundles and routed to the FO pig tail bundles 56 and 58. The FO pig tails start out as roughly flat ribbon shaped cross sections. At region 54, they are formed into the required cross-sectional shape at the pig tail ends 48 and 60, during the manufacturing. Although two bundles are shown in the figure, a plurality of bundles may be embodied. These pig tail ends may be made circular, rectangular or some other required shape. The size and shape of these faces are designed to couple efficiently to the chosen Light Sources A (element 41A) and light source B (element 41B). The individual fibers may be tapered or expanded, and they may be arranged for roughly even light distribution, at the fiberoptic backlight plate 45. The fiber distribution may be coherent or it may random, depending on the application. Light Source A may be designed for a desired spectral or display performance output, which will satisfy one set of display requirements, and Source B maybe designed for another set of display requirements. The user is then able to quickly and simply switch to which ever light source he/she desires.

The light rays diverging from Source A may be collimated to roughly parallel light rays by collimating lens 46, which directs the light to pig tail end face 48. Similarly, light rays diverging from Source B may be collimated to parallel rays by lens 50, which directs the light to pig tail end face 60. Each collimating lenses 46 or 50 may consist of several lenses (e.g.; a lens system), instead of the single lens at each end, as shown. One or more optical filters, polarizes or compensators may be placed on either side of each lens, which is well know to those skill in the art. The backlight plate 45 is much thinner than prior art backlight designs. The backlight plate is electrically passive without EMI/RFI emissions. The plate is thermally cool because the light source is a large distance away. The light source lamps can be easily maintained, because they can be placed where they can be easily replaced without dissembling the display device. A much greater selection of light sources is possible with great flexibility in possible component sizes. The overall cost will be lower than prior art backlight lamps. In a typical backlight application, Light source A may have a cold spectral wavelength output (i.e., without IR or near IR wavelengths greater than 624 nm) and at low light intensity. This source can be powered ON for night viewing. Light Source B could have a wide spectral output and at high light intensities. This latter source may be powered ON when daylight viewing is required. Thus, one or more backlight sources may be selected by the user via a simple switch as required. Light from one source or more sources can be optically guided through the optical fibers and distributed roughly uniform over the backlight plate area 45.

Figure 9:
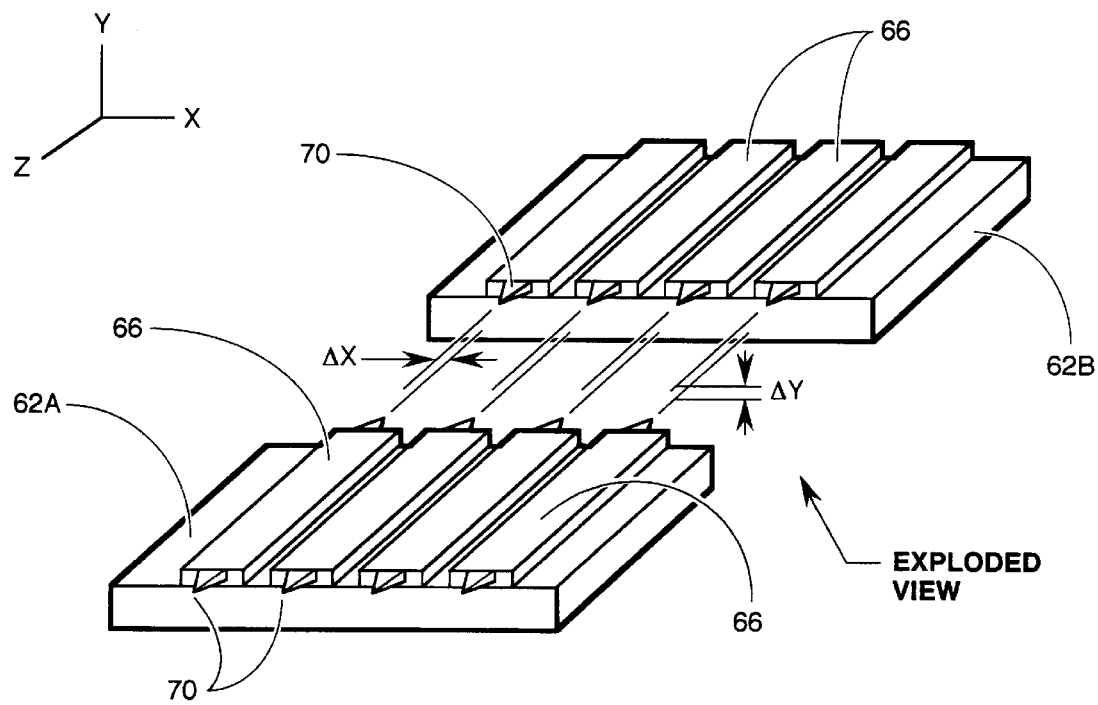
FIG. 9 is an exploded perspective view of two display sub-panels with conductor electrode lines and micro tips.

FIG. 9 shows an embodiment of two flat display sub-panel substrates with a multiplicity of conductor lines. The figure presents a magnified view of two display sub-panel substrates 62A and 62B, physically separated along the z-axis. The substrates may be glass, silicon or another appropriate display panel substrate. On each sub-panel substrate 62A and 62B are a multiplicity of conductor lines 66 deposited and/or etched onto their top surfaces. In typical embodiments there could be thousands of small conductors lines that may be roughly a micron thick and approximately ten microns or so wide. Onto the ends of the conductor lines are sharp micro tip structures 70, which may be etched or cut onto each conductor end. During the fabrication of a display panel, the objective is to bond these two sub-panel substrates together and make an electrical connection means for all the conductor lines. As the two substrates are bought together, there will be small misalignments in $\Delta x$, $\Delta y$ and $\Delta z$ with respect to each conductor micro tip, as shown in FIG. 9. These misalignments may be due to manufacturing tolerances and/or fabrication processing errors. Although attempts will be made to reduce the manufacturing tolerances, misalignments are inevitable, and they may build up across the large display area. FIG. 9 shows the gap between the sub-panel substrates in an exploded view, for clarity. In practice, the two substrates 62A and 62B will be brought much closer together, where gap dimensions in the z direction may be several microns to hundreds of microns. The micro tips need not physically touch each other. In fact, due to tolerance error, it would be almost impossible for all the opposing micro tips to make physical contact.

Figure 10:
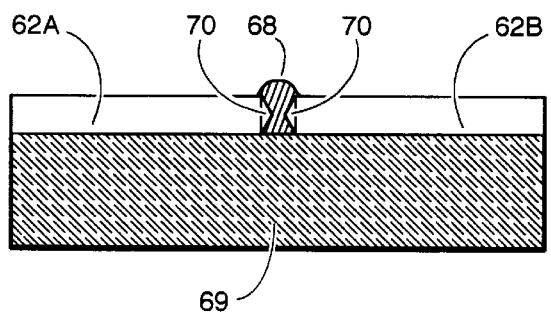
FIG. 10 is a cross section side view of the two sub-panels, micro tip and bonding adhesive.

FIG. 10 shows a side cross section view of the above connection arrangement in more detail. An electrical insulating and adhesive material 68 may be placed between the conductor micro tips 70. This material is selected to provide two primary functions: 1) electrical insulation film that will allow semiconductor tunneling, and 2) acts as a glue to physically fixed the two sub-panel substrates and the conductor lines in position. The conductor micro tips and insulator will then form a metal insulator metal interface, like a thin film MIM diode. The insulator of the diode may doped with carriers to obtain semiconductor tunneling characteristics. If the insulator is thin and voltage across the interface sufficient, electrons will tunnel through the insulator gap from micro tip to the corresponding (opposite) micro tip. With proper selection of the conductors and insulator materials, the electrical resistance can be low. Electrons will tunnel through the insulator to the nearest opposing micro tip. As long as the position errors in the x, y, z directions are not too large, semiconductor tunneling will occur to the correct opposing micro tip. Therefore, a certain amount of misalignment will be tolerated. In some cases, one or more micro tip may touch the corresponding micro tip, which should also be tolerated by the electronics. A structural support substrate 69 is placed under the two substrates during manufacture, for support and alignment. The support substrate may have a very flat top surface and other means for accurately aligning the two sub-panels. The support substrate may be boned to the sub-panels to provide a rigid support for the final display device product.

The two substrates shown in FIG. 9 and 10 represent two display sub-panels making a micro tip tunneling connection means. Typically, to make a flat display panel matrix of orthogonal conductor lines are required. Therefore, additional sub-panel assemblies similar to 62A and 62B will be required on separate substrates, with conductors running orthogonal, forming the standard rows and columns of the matrix display. Although the orthogonal conductor lines are not shown in the figures, they be made similar to those shown in FIG. 9, but running orthogonal and usually placed under the other sub-panel assemblies.

Matrix addressed display devices may have thousands of orthogonal electrodes or conductors deposited and/or etched onto substrates over large areas. In Thin Film (TFT) Active Matrix Liquid Crystal Display (AMLCD) devices, source and gate electrodes are also routed over the display panel area. There has been prior art in LCD panel means for Integrated Circuits (IC) and chip on glass (COG) designs. There is also prior art in integrating thin film VLSI IC circuits onto single glass or silicon substrates. However, display panel areas of 100 sq. inches or more would require very expensive lithographic equipment and being very difficult to manufacture. This would make it difficult to produce low cost flat display panels. The invention described herein can be used with the above technologies, to realize lower cost panels. Using the inventions described here, one can manufacture smaller sub-panel assemblies, like 62A and 62B that can be place together, i.e.; "tiled" together to make a larger display panel. Alternately, this invention can be used to electrically and physically interconnected two or more ICs on separate substrates or dyes. In the case, the invention results a new type of hybrid IC micro aligning and assembling means.

As shown in FIG. 10, special techniques and processes may used during the fabrication of the tiled display panel or hybrid IC to assure proper alignment and operation. When two display sub-panels or IC substrates 62A and 62B are ready for alignment and bonding, temporary electrical connections may be made to the ends of the electrodes. The two sub-panels may be placed on the support substrate 69. The insulator and adhesive material 68 is added covering the inside edges of both substrates and the micro tips. An electrical signal is applied to each line on one sub-panel and signal sensing circuitry is attached to the outside ends of the other sub-panel. When two opposite micro tips are adjusted sufficiently close together, an electrical signal will flow (tunnel) across the gap. When all the electrodes lines have a signal current flowing across the gap, the two sub-panel are correctly aligned, and the insulating and adhesive material 68 can be cured to a harden state. This is then repeated for each tile of the display panel or IC substrate. In IC device assemblies, special circuitry should be included in their design to allow for this assembly test mode. The assembly test mode will route (switch) all input the lines to drive all the output lines, specifically for this substrate aligning test. Thus micro position alignment equipment can be continuously being adjusted while the electrical signals are applied and sensed. This can be accomplished very quickly, in an coordinated manner, during the fabrication process.

Figure 11:
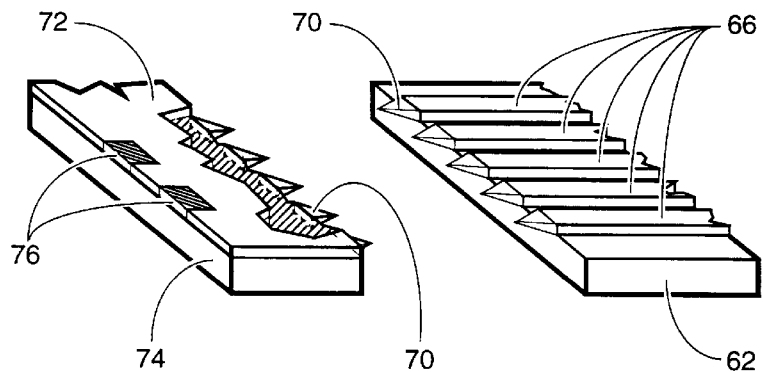
FIG. 11 is a section perspective view also exploded showing a IC section and a display sub-panel.

FIG. 11 presents a means to connect a driver IC to the display panel, using the micro tip alignment mean. A display driver IC unit 74 may contain display driver circuitry, microprocessor or other circuitry, which is designed to be connected to the display sub-panel 62. As above, the display sub-panel 62 contains the many conductors lines 66 and micro tips 70 on a substrate. The display driver IC unit 74 is also manufactured with the corresponding conduct lines and micro tips on one side. The high density circuitry is fabricated near the top surface of a IC region 72 by standard lithographic and VLSI fabrication techniques. The display driver circuitry may contain the standard multiplexing circuits allowing a small number of signal input lines 76 to select and drive a larger number of output lines, in the standard manner known to those skill the art. For example, n input lines can select and drive any one of $2^n$ lines. The key advantage of this invention is a simple and quick means of integrating a driver IC with few input connections and many output connections to a display panel with the correspond conductor lines. FIG. 11 is also shown in exploded view, showing a large gap between the micro tips on display driver IC unit 74 and display sub-panel 62. In practice the gap shown in the figure will be in the micron range. The figure shows only a section of one IC unit to sub-panel interface. Connections to the remaining orthogonal row and column electrodes on other separate sub-panels and other IC sections will be made in the same or similar way as described above. An advantage of using separate substrates for the driver IC units and display portion of the display is that the IC features have a higher density, covering small areas, but the display panel region are sparsely populated with larger features (conductor lines) covering large areas. Thus, very different lithographic and LSI techniques are typically used in each fabrication process. It may be more cost effective to fab the two components separately and integrate them as above.

Figure 12:
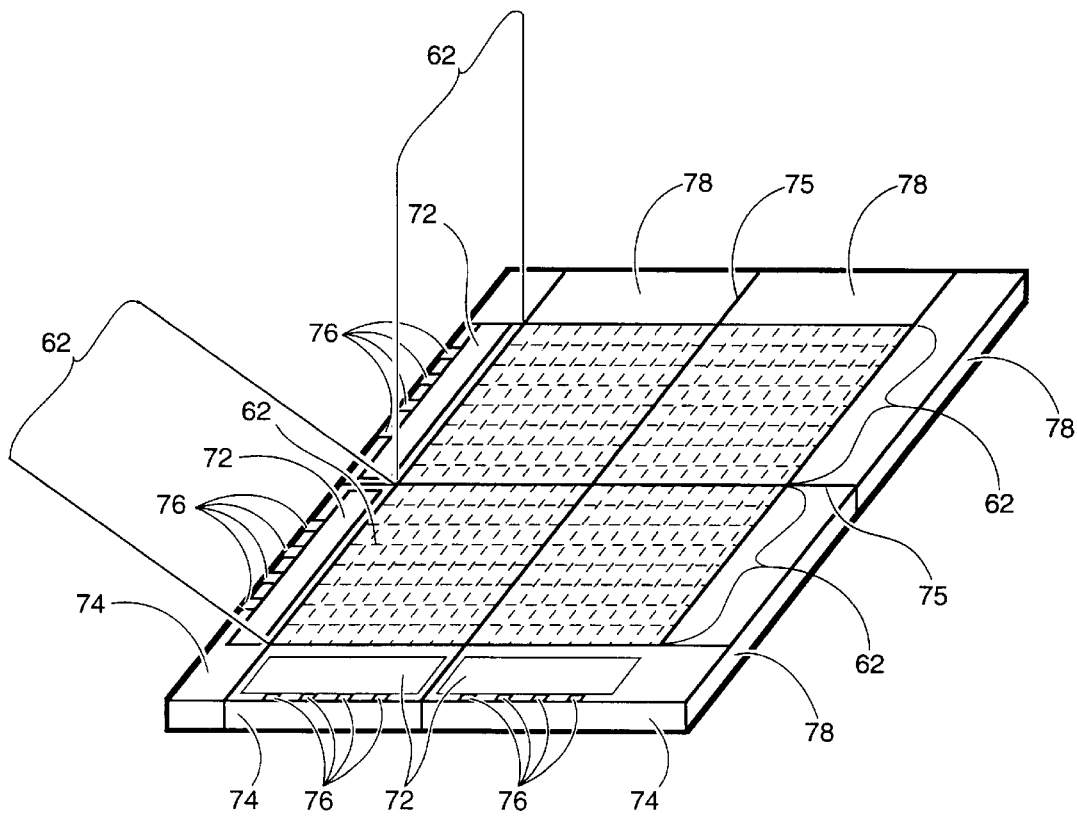
FIG. 12 is a perspective view of a flat panel display with row and column driver IC sections bonded to the tiled panel.

A tiled display panel made from the above sub-panels and drive ICs is shown in FIG. 12, consisting of four top sub-panels 62, four orthogonal bottom sub-panels directly under the top sub-panels (hidden from view), and several display driver IC units 74 at the edges. The orthogonal lines are schematically represented in the figure by the dotted lines. Typical matrix displays are driven from both sides of the row and column lines—alternating the connections to adjacent lines. This is done because of there is very little space between the large number of the conductor lines in modern displays. However, using the above micro tip integration means, this is no longer a problem. Regions marked as 72 are where the display driver circuitry may be placed. Electrical connection pads 76 are shown on sides of the display panel. These conductive pads are where external wires, typically ribbon cables, are connected to the display panel. As shown in FIG. 12, for example, eight row pads and eight column pads are shown. Using the well known display drive multiplexing circuity, any one of $2^8=256$ lines can be selected and driven. Typical, flat panel display devices for computer displays will require more lines than this example shows. Panel regions 78, on the opposite sides of the to panel from the drive IC units 74, may used for other circuitry, as required by the display device or micro computer system.

In FIG. 12, tile edge lines 75, marking the interfaces on the top display panel (screen area), should be made to appear vary faint or disappear completely. On displays made with clear glass as the display screen, this will be difficult. However, if the top substrate is made of a FO faceplate, several means may be used to make the lines disappear. For example, the plate could be cut in a jagged manner and fitted together with other top sub-panel substrates. Also the substrates may be fused together, by a heating means that will fuse the glass fibers and matrix material, but not damage the rest of the display panel. If the display panel is a Field Emission Display (FED), than there is no need to fabricated separate top sub-panels. For FEDs the entire top substrate can be made of one single material. This is one very desirable advantage of FEDs over LCDs. The FED will still have two orthogonal conductor electrode substrate, but both substrates will be placed underneath a top anode/phosphor substrate. Therefore, for FEDs, the tile edge lines will be completely hidden from the viewer.

The embodiments disclosed above are just some of the possible embodiments that may be realized with these inventions. Other embodiments with additional known elements and components are well known to those skilled in the art.

I claim:

1. An electrical substrate combination comprising:
   a. a first substrate having a multiplicity of thin conductors lines having micro tips fabricated onto the conductor ends near the edge of the substrate;
   b. a second substrate placed next to the first substrate on roughly the same plane as the first substrate, having a multiplicity of thin conductors lines having micro tips fabricated onto the conductor ends near the edge of the second substrate, wherein the two substrates are placed relatively close together defining a gap, and wherein the micro tips are oriented roughly opposite each other; and
   c. means for micro interconnection via an electrical insulation material, wherein the insulation material is placed between the micro tips near the substrate edges, such that electronic tunneling occurs between the opposing micro tips when a sufficient voltage is applied across the gap.

2. An electrical substrate combination as recited in claim 1, in which the insulation material of the micro interconnection means also includes the properties of an adhesive for physically bonding the substrates together.

3. An electrical substrate combination as recited in claim 1, further comprising a support substrate and means for micro aligning the first and second substrates, wherein the support substrate is placed under the first and second substrates and is bonded to them, and wherein the support substrate has a flat top surface to help support and align the first and second substrates with their associated micro tips and interconnection means.

4. An electrical substrate combination as recited in claim 1, in which one or both of the substrates may contain integrated circuitry forming IC units, wherein the IC units are interfaced via the micro interconnection means.

5. An electrical substrate combination as recited in claim 4 further comprising means for testing the interconnection means during fabrication, wherein the IC units are adapted for a test mode, and wherein electrical test voltages or currents are applied across the interconnections, the testing means including means for detection test voltages or currents.

6. A flat panel display device defining a display screen, row electrodes, column electrodes and multiplicity of display pixels, wherein each pixel is near an intersection of the row and column electrodes, the display device comprising:
   a. a top substrate having a plurality of sub-unit substrates tiled together, wherein at least one sub-unit substrate has a multiplicity of electrodes fabricated onto it, and wherein at least one electrode has a micro tip fabricated onto one or both ends;
   b. a bottom substrate placed under the top substrate, the bottom substrate having a plurality of sub-unit substrates tiled together, wherein at least one sub-unit substrate has a multiplicity of electrodes fabricated onto it, and wherein at least one electrode has a micro tip fabricated onto one or both ends;

c. means for micro tip interconnection in which electrical insulation material is placed in a gap between each tiled sub-unit substrate, such that electronic tunneling occurs between the opposing micro tips when a sufficient voltage or current is applied across the said gaps; and d. said sub-unit substrate combinations forming the top and bottom substrates are oriented so that the conductor lines of top and bottom substrate are orthogonal, forming row and column display electrodes.

7. A flat panel display device recite in claim 6, in which the top substrate is eliminated and bottom substrate includes both row and column electrodes, wherein the said orthogonal row and electrodes intersect near each display panel pixel.

8. A flat panel display device recited in claim 7, in which the display device is a field emission display device, wherein at least one substrate is made from tiled sub-panels and the said display screen is made of a transparent glass sheet.

9. A flat panel display device as recited in claim 6, in which the sub-panels of the top substrate, bottom substrate or both substrates include integrated circuits for driving the display device and/or control functions.

10. An integrated circuit defining a multiplicity of electronic devices and micro conductor lines, fabricated onto one or more surfaces, the integrated circuit comprising:

a. a plurality of sub-unit integrated circuits electrically and mechanically interconnected together at their edges in a tiled fashion forming a larger integrated circuit, wherein two or more sub-unit integrated circuits is placed relatively close together defining a small gap between the sub-unit integrated circuits;

b. micro tip interconnection means fabricated at the ends of certain conductor lines at the edge of a least two sub-unit integrated circuits, such that electronic tunneling can occur between the opposite micro tips of the sub-unit integrated circuits when a sufficient voltage or current is applied across the gap between the sub-units; and c. said larger integrated circuit forming a electrical circuit to perform at least one function.

11. An integrated circuit as recited in claim 10, in which the sub-unit integrated circuits are tiled together and interconnected in two dimensions in a roughly planar fashion defined by the plane of the sub-unit integrated circuits.

12. An integrated circuit as recited in claim 10, in which the sub-unit integrated circuits are tiled together and interconnected in three dimensions, wherein the sub-unit integrated circuits are stacked in addition to being tiled in one plane.

* * * * *